(12) United States Patent
Esseghir

(10) Patent No.: US 10,026,519 B2
(45) Date of Patent: Jul. 17, 2018

(54) ELECTRICALLY CONDUCTIVE, OLEFIN MULTIBLOCK COPOLYMER COMPOSITIONS

(75) Inventor: Mohamed Esseghir, Monroe Township, NJ (US)

(73) Assignee: UNION CARBIDE CHEMICALS & PLASTICS TECHNOLOGY LLC, Midland, MI (US)

(*) Notice: Subject to any disclaimer, the term of this patent is extended or adjusted under 35 U.S.C. 154(b) by 1188 days.

(21) Appl. No.: 13/699,984

(22) PCT Filed: May 26, 2011

(86) PCT No.: PCT/US2011/038048
§ 371 (c)(1),
(2), (4) Date: Nov. 26, 2012

(87) PCT Pub. No.: WO2011/159446
PCT Pub. Date: Dec. 22, 2011

(65) Prior Publication Data
US 2013/0069013 A1    Mar. 21, 2013

Related U.S. Application Data

(60) Provisional application No. 61/356,161, filed on Jun. 18, 2010.

(51) Int. Cl.
*H01B 1/04* (2006.01)
*C08K 5/14* (2006.01)
(Continued)

(52) U.S. Cl.
CPC .............. *H01B 1/04* (2013.01); *C08K 5/14* (2013.01); *C08L 53/00* (2013.01); *H01B 1/22* (2013.01);
(Continued)

(58) Field of Classification Search
CPC ........................................................ H01B 1/04
(Continued)

(56) References Cited

U.S. PATENT DOCUMENTS 4,018,852 A   4/1977  Schober
4,857,600 A   8/1989  Gross et al.
(Continued)

FOREIGN PATENT DOCUMENTS

CN   101376732   3/2009
DE    3643008    6/1988
(Continued)

OTHER PUBLICATIONS

Potemkin, I.I., "Microphase separation in correlated random copolymers; Mean-filed theory and fluctuation corrections" Physical Review vol. 57 No. 6 Jun. 1998.
(Continued)

*Primary Examiner* — William Young
(74) *Attorney, Agent, or Firm* — Husch Blackwell LLP

(57) ABSTRACT

Free radically crosslinked, electrically conductive compositions exhibiting a highly stable volume resistivity comprise an olefin multiblock copolymer (OBC) and a conductive filler, e.g., a conductive carbon black. These compositions exhibit a highly stable volume resistivity relative to a composition similar in essentially all aspects save that the OBC is replaced with a conventional polyethylene of similar density and melt index.

12 Claims, 1 Drawing Sheet

(51) Int. Cl.

| | | |
|---|---|---|
| *C08L 53/00* | (2006.01) | |
| *H01B 1/22* | (2006.01) | |
| *H01B 1/24* | (2006.01) | |
| *C08K 3/013* | (2018.01) | |
| *C08K 3/00* | (2018.01) | |
| *C08K 3/04* | (2006.01) | |
| *C08K 3/08* | (2006.01) | |
| *B82Y 30/00* | (2011.01) | |

(52) U.S. Cl.
CPC ............... *H01B 1/24* (2013.01); *B82Y 30/00* (2013.01); *C08K 3/0033* (2013.01); *C08K 3/013* (2018.01); *C08K 3/04* (2013.01); *C08K 3/08* (2013.01); *C08K 2201/001* (2013.01); *Y10S 977/734* (2013.01); *Y10S 977/742* (2013.01)

(58) Field of Classification Search
USPC .......................................... 252/511, 512, 502
See application file for complete search history.

(56) References Cited

U.S. PATENT DOCUMENTS

| | | | |
|---|---|---|---|
| 5,246,783 | A | 9/1993 | Spenadel et al. |
| 5,272,236 | A | 12/1993 | Lai et al. |
| 5,278,272 | A | 1/1994 | Lai et al. |
| 5,346,961 | A | 9/1994 | Shaw et al. |
| 5,575,965 | A | 11/1996 | Caronia et al. |
| 5,986,023 | A | 11/1999 | Harlow et al. |
| 6,496,629 | B2 | 12/2002 | Ma et al. |
| 6,714,707 | B2 | 3/2004 | Rossi et al. |
| 7,910,658 | B2 * | 3/2011 | Chang ................ A61F 13/4902 525/191 |
| 2003/0075707 | A1 | 4/2003 | Easter |
| 2005/0062024 | A1* | 3/2005 | Bessette ................ B82Y 30/00 252/500 |
| 2005/0209387 | A1 | 9/2005 | Doi et al. |
| 2006/0199887 | A1 | 9/2006 | Liang et al. |
| 2007/0167578 | A1* | 7/2007 | Arriola et al. ................ 525/242 |
| 2007/0244228 | A1 | 10/2007 | Novak et al. |

FOREIGN PATENT DOCUMENTS

| | | |
|---|---|---|
| EP | 1052654 | 11/2000 |
| EP | 1116747 | 7/2001 |
| JP | 2002206054 | 7/2002 |
| JP | 2004346234 | 12/2004 |
| JP | 2005264017 | 9/2005 |
| JP | 2007326891 | 12/2007 |
| JP | 2009013212 | 1/2009 |
| WO | 2005090427 | 9/2005 |
| WO | 2006/101932 A2 | 9/2006 |

OTHER PUBLICATIONS

Dobrynin, A.V., "Phase coexistence in random copolymers" J. Chem Phys. 107 (21) Dec. 1, 1997.
International Preliminary Report on Patentability for PCT App. No. PCT/US2011/038048 dated Jul. 26, 2012.
International Search Report for PCT App. No. PCT/US2011/038048 dated Aug. 29, 2011.

* cited by examiner

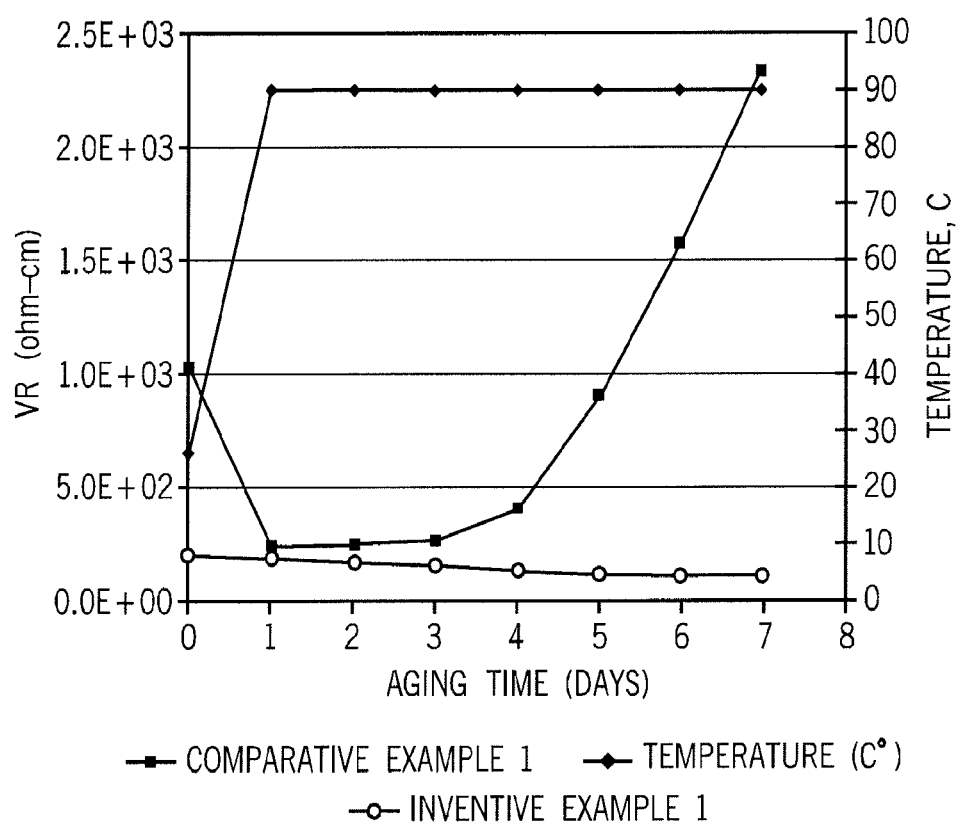

ELECTRICALLY CONDUCTIVE, OLEFIN MULTIBLOCK COPOLYMER COMPOSITIONS

CROSS REFERENCE TO RELATED APPLICATION

The present application is the national phase of PCT Patent Application No. PCT/US2011/038048 filed May 26, 2011, which claims the benefit of U.S. Ser. No. 61/356,161, filed Jun. 18, 2010. The entire content of which is incorporated by reference herein.

BACKGROUND OF THE INVENTION

1. Field of the Invention

This invention relates to wire and cable. In one aspect the invention relates to flexible wire and cable coverings, articles and accessories while in another aspect, the invention relates to olefin multiblock copolymer compositions from which flexible wire and cable coverings are made.

2. Description of the Related Art

Flexible, electrically semiconductive compounds are desired in many applications, for example wire and cable, industrial belts (anti-static), printing rollers, etc. In wire and cable applications, flexibility is desirable for ease of reeling and, also, handling during installation. Also, in some applications, such as in industrial cables and cords, flexible cables are required.

Wire and cable accessories are other applications in which flexibility is important, e.g., molded or extruded parts used to connect or terminate cables. In these applications flexibility is highly desirable for ease of installation.

To achieve the desired flexibility, generally elastomeric materials, such as ethylene-propylene-diene monomer (EPDM) and other olefin elastomers, synthetic rubbers, silicone rubbers and their various blends are used. In order to achieve the desired volume resistivity for any given application and, critically, for this volume resistivity to remain stable under operating conditions, a high loading of carbon black is typically needed. For example, in wire and cable applications generally a volume resistivity value of less than (<) 1000 ohm per centimeter (ohm-cm) and, preferably, <500 ohm-cm, is required. This requires a high loading of conductive carbon black, e.g., 35% wt. or higher. As mentioned, this is to establish a stable conductive network, which would lead to stable conductivity during operation of the power cable.

Of continuing interest is a semiconductive compound exhibiting a low volume resistivity (<500 ohm-cm) which remains stable under aging conditions with minimal carbon black loading so as to maintain desired material flexibility.

SUMMARY OF THE INVENTION

Free radical crosslinked, electrically conductive compositions exhibiting a highly stable volume resistivity comprise an olefin multiblock copolymer (OBC) and a conductive filler, e.g., a conductive carbon black. These compositions exhibit a highly stable volume resistivity relative to a composition similar in essentially all aspects save that the OBC is replaced with a conventional polyethylene of similar density and melt index. For example, a composition comprising a substantially linear ethylene-butene copolymer of similar density and melt index exhibits (i) initially a higher volume resistivity at room temperature compared to its OBC counterpart, but, more critically, (ii) while exhibiting a similar volume resistivity during initial aging at 90° C., it unexpectedly shows a drastic increase in volume resistivity as the 90° C. aging period continues, and at the end of the aging test, its volume resistivity has increased by a factor of more than 20. In contrast, the volume resistivity of the OBC composition remains low and highly stable throughout the aging period.

In one embodiment the invention is a composition comprising:
A. An olefin multiblock copolymer, and
B. Conductive filler.

In one embodiment the invention is a composition comprising in weight percent (wt %) based on the weight of the composition:
A. 60 to 99% olefin multiblock copolymer,
B. 40 to 1% conductive filler,
C. Optionally an elastomer other than an OBC,
D. Optionally a plasticizer,
E. Optionally a cure agent, and
F. Optionally one or more additives.

In one embodiment the OBC is an ethylene/a-olefin multiblock interpolymer comprising one or more hard segments and one or more soft segments, the hard and soft segments having a difference in mole percent (mol %) of alpha-olefin content. In one embodiment the OBC is characterized by a weight average molecular weight (Mw) of greater than (>) 40,000 grams per mole (g/mol), a molecular weight distribution, Mw/Mn or MWD, of 1.7 to 3.5, and a difference in mole percent of α-olefin content between the soft segment and the hard segment of less than 18.5 mol %.

In one embodiment the conductive filler is at least one of carbon black and metal fiber. In one embodiment the elastomer other than OBC is at least one of a non-OBC olefin, e.g., an ethylene-propylene rubber, and a non-olefin elastomer, e.g., a silicone and/or urethane rubber. In one embodiment the plasticizer is a liquid, e.g., a liquid plasticizer oil or extender. In one embodiment the cure agent comprises peroxide and, optionally, one or more of a cure co-agent and a scorch retardant. In one embodiment the composition is crosslinked. In one embodiment the composition is formed into an article, e.g., a wire or cable covering, such as a semiconductor shield or a protective jacket or the like. In one embodiment the composition is formed into a film or sheet, e.g., an anti-static film or sheet for electronic packaging.

BRIEF DESCRIPTION OF THE DRAWINGS

The FIGURE is a volume resistivity versus time plot of Inventive and Comparative Examples 1.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Multiblock copolymer", "segmented copolymer" and like terms mean a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to conventional block interpolymers, including interpolymers produced by sequential monomer addition, fluxional catalysts, or anionic polymerization techniques, the OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

"Crosslinked", "cured" and similar terms mean that the polymer, before or after it is shaped into an article, was subjected or exposed to a treatment which induced crosslinking and has xylene or decalene extractables between 40 and 100 weight percent (i.e., greater than or equal to 40 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

Olefin Multiblock Copolymer

In one embodiment the OBC is produced in a continuous process and possesses a PDI of 1.7 to 3.5, or of 1.8 to 3, or of 1.8 to 2.5, or of 1.8 to about 2.2. When produced in a batch or semi-batch process, the OBC possesses a PDI of 1.0 to 3.5, or of 1.3 to 3, or of 1.4 to 2.5, or of 1.4 to 2.

In addition, the olefin multiblock copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In one embodiment the olefin multiblock copolymer possesses a most probable distribution of block lengths. In one embodiment the olefin multiblock copolymer is defined as having:

A. Mw/Mn of 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

B. Mw/Mn of 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, in which the numerical values of ΔT and ΔH have the following relationships:

$$\Delta T > -0.1299(\Delta H) + 62.81 \text{ for } \Delta H \text{ greater than}(>) \text{ zero and up to 130 J/g}$$

$$\Delta T \geq 48° \text{ C. for } \Delta H > 130 \text{ J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or C. Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

Re>1481−1629(d); and/or

D. Has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, in which the comparable random ethylene interpolymer has the same comonomer(s) and has a melt index, density and molar comonomer content (based on the whole polymer) within 10 percent of that of the ethylene/α-olefin interpolymer; and/or E. Has a storage modulus at 25° C., G'(25° C.), and a storage modulus at 100° C., G'(100° C.), in which the ratio of G'(25° C.) to G'(100° C.) is in the range of 1:1 to 9:1.

The olefin multiblock copolymer may also have:

F. A molecular fraction which elutes between 40° C. and 130° C. when fractionated using TREF, characterized in that the fraction has a block index of at least 0.5 and up to 1 and a molecular weight distribution, Mw/Mn, greater than 1.3; and/or G. Average block index greater than zero and up to 1.0 and a molecular weight distribution, Mw/Mn greater than 1.3.

The olefin multiblock copolymer may have one, some, all, or any combination of properties (A)-(G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydro-naphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In one embodiment, the OBC has a density of less than or equal to 0.90 grams per cubic centimeter (g/cc), or less than 0.89 g/cc. Such low density OBC are generally characterized as amorphous, flexible and having good optical properties, e.g., high transmission of visible and UV-light and low haze.

In one embodiment the olefin multiblock copolymer has a density of 0.85 to 0.88 g/cc. In one embodiment the olefin multiblock copolymer has a density of 0.87 to 0.88 g/cc.

In one embodiment the olefin multiblock copolymer has a melt index (MI) of 0.1 to 100 grams per ten minutes (g/10 min). In one embodiment the olefin multiblock copolymer has an MI of 0.1 to 50 g/10 min. In one embodiment the olefin multiblock copolymer has an MI of. 0.1 to 30 g/10 min. MI is measured by ASTM D 1238 (190° C./2.16 kg).

In one embodiment the olefin multiblock copolymer has a 2% secant modulus greater than zero and less than 150, or less than 140, or less than 120, or less than 100, megapascals (MPa) as measured by the procedure of ASTM D 882-02.

In one embodiment the OBC has a melting point of less than 125° C. The melting point is measured by the differential scanning calorimetry (DSC) method described in WO 2005/090427 or US2006/0199930.

In one embodiment, the olefin multiblock copolymer contains 5 to 30 wt %, or 10 to 25 wt %, or 11 to 20 wt % of a hard segment. The hard segment is free of or contains less than 0.5 mol % units derived from comonomer. The olefin multiblock copolymer also contains 70 to 95 wt %, or 75 to 90 wt %, or 80 wt % to 89 wt % of a soft segment. The soft segment contains less than 15 mol %, or 9 to 14.9 mol % units derived from comonomer. In one embodiment the comonomer is butene or octene. Comonomer content is measured by nuclear magnetic resonance (NMR) spectroscopy.

The OBC may be modified by, for example, grafting, hydrogenation, nitrene insertion reactions, or other functionalization reactions such as those known to those skilled in the art. Preferred functionalizations are grafting reactions using a free radical mechanism. A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

For silane grafted OBC crosslinking may be promoted with a crosslinking catalyst, and any catalyst that will provide this function can be used in this invention. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts. Functionalized OBC are more fully described in US 2006/0199914.

The OBC typically comprises at least 60, more typically at least 65 and even more typically at least 70, wt % of the electrically conductive OBC composition. The OBC typically comprises not more than 99, more typically not more than 90 and even more typically not more than 85, wt % of the electrically conductive OBC composition.

Conductive Filler

Any conductive filler that will impart a volume resistivity of less than 1,000, preferably less than 500 and more preferably less than 250, ohm-cm, to the composition can be used in the practice of this invention. Representative conductive fillers include but are not limited to conductive carbon blacks, conductive carbons and metal particles. Mixtures of two or more of these conductive fillers can be employed in any relative proportion. The fillers may carry or contain various surface coatings or treatments, such as silanes, fatty acids, and the like.

The total conductive filler used in the practice of this invention comprises at least 1, preferably at least 10 and more preferably at least 20, wt % of the composition. The only limit on the maximum amount of filler in the composition is that imposed by practical considerations such as cost and performance, but typically a general total maximum comprises less than 50, more typically less than 36, wt % of the composition.

Carbon Black

The conductive carbon blacks can be selected from any of the carbon blacks listed in ASTM D-1765-76, which includes carbon blacks so listed in accordance with their ASTM designations: N50, N60, N110, N121, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. Carbon black also includes furnace black, acetylene black, thermal black, lamb black and Ketjen black. These carbon blacks have iodine absorptions ranging from 10 to 200 g/kg and DBP number ranging from 30 to 400 cc/100 g, nitrogen surface area ranging from 10 to 1,000 $cm^3/100$ g. The surface area is determined under ASTM D 4820-93a (Multipoint B.E.T. Nitrogen Adsorption). Generally, smaller particle sized carbon blacks are employed to the extent cost considerations permit. In one embodiment the carbon black is N110-type carbon black to achieve good weathering performance in wire and cable jacketing. In one embodiment the carbon black is conductive furnace black.

Conductive Carbon

The conductive carbon, as distinguished from conductive carbon black, includes at least one of carbon fiber, carbon nanotubes, fullerene, graphene, graphites and expanded graphite platelets. The average particle size of such material is typically of nano-scale proportions.

Metal Particles

The conductive metal particles include granules, powder, fibers, platelets, and the like. These metal particles typically have an average particle size of 0.1 to 100, more typically 0.3 to 30, microns as measured by X-ray line broadening. The metal particles may have any particle shape desired although, as is known, the shape selection may depend upon the intended end use of the metal-filled product. Spherical shapes, platelets, prismatic shapes, whiskers, and the like, can be used.

Metals that can be used as a conductive filler include, alone or in admixture with one or more other such metals, or as finely powdered alloys, aluminum, indium, tin, lead, bismuth, as well as Groups II-B through VII-B elements of the Periodic System including such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, and the like. Particularly satisfactory for convenience and relative cheapness are aluminum, zinc, iron, nickel, tin, lead, and silver. Copper, while conductive, may in its metallic form be objectionable in some rubber compounding formulations.

Optional Elastomer

Olefin Elastomer

The optional olefin elastomers useful in the practice of this invention include both polyolefin homopolymers and interpolymers. These optional olefin elastomers specifically exclude OBC elastomers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky, but they are not olefin multiblock copolymers as described above.

The optional olefin elastomer can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of the optional olefin elastomers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The optional olefin elastomers useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

The optional olefin elastomers, particularly the ethylene elastomers, useful in the practice of this invention typically have, before grafting, a density of less than 0.91, preferably less than 0.90, grams per cubic centimeter (g/cc). The ethylene copolymers typically have a density greater than 0.85, preferably greater than 0.86, g/cc. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene elastomers useful in the practice of this invention typically have, before grafting, a melt index greater than 0.10 and preferably greater than 1 gram per 10 minutes (g/10 min). The ethylene elastomers typically have a melt index of less than 500 and preferably of less than 100, g/10 min. Melt index is measured by the procedure of ASTM D-1238 (190° C./2.16 kg).

The optional olefin elastomer, if present, is typically used in amounts ranging from 1 to 40 wt % based on the weight of the composition. Preferably, the optional olefin elastomer is used in an amount ranging from 5 to 30, more preferably from 10 to 30, wt % based on the weight of the composition.

Non-Olefin Elastomers

The optional non-olefin elastomers useful in the practice of this invention include the silicone and urethane elastomers, styrene-butadiene rubber (SBR), nitrile rubber, chloroprene, fluoroelastomers, perfluoroelastomers, polyether block amides and chlorosulfonated polyethylene. The silicone elastomers are polyorganosiloxanes typically have an average unit formula $R_aSiO_{(4-a)/2}$ which may have a linear or partially-branched structure but is preferably linear. Each R may be the same or different. R is a substituted or non-substituted monovalent hydrocarbon group which may be, for example, an alkyl group, such as a methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be terminated by any of the above groups or with hydroxyl groups. When R is an alkenyl group the alkenyl group is preferably a vinyl group or hexenyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

The urethane elastomers are prepared from reactive polymers such as polyethers and polyesters and isocyanate functional organic compounds. One typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates. The urethane elastomers are commercially prepared having various ratios of isocyanate compounds and polyethers or polyesters.

The most common of the urethane elastomers are those containing hydroxyl functional polyethers or polyesters and, low molecular weight polyfunctional, polymeric isocyanates. Another common material for use with hydroxyl functional polyethers and polyesters is toluene diisocyanate.

Nonlimiting examples of suitable urethane rubbers include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers. Preferred urethane rubbers are those so-called "millable" urethanes such as MILLATHANE™ grades from TSI Industries.

Additional information on such urethane materials can be found in Golding, Polymers and Resins, Van Nostrande, 1959, pages 325 et seq. and Saunders and Frisch, Polyurethanes, Chemistry and Technology, Part II, Interscience Publishers, 1964, among others.

The optional silicone and urethane rubbers can be used alone or in combination with one another, and are typically used in amounts ranging from 1 to 40 wt % based on the weight of the composition. Preferably, these optional rubbers are used in an amount ranging from 5 to 30, more preferably from 10 to 30, wt % based on the weight of the composition.

Optional Plasticizer

The optional plasticizers (which term as here used includes not only conventional plasticizers, but also oil extenders, waxes, paraffins and solvents) useful in the practice of this invention include, but are not limited to, phthalic acid diesters (also known as "phthalates") such as di-isononyl phthalate (DINP), diallyl phthalate (DAP), di-2-ethylhexyl-phthalate (DEHP), dioctyl phthalate (DOP) and diisodecyl phthalate (DIDP); trimellitates such as trimethyl trimellitate, n-octyl trimellitate, and tri-(2-ethylhexyl)trimellitate; adipate-based plasticizers such as bis(2-ethylhexyl) adipate, dimethyl adipate and dioctyl adipate; sebacate-based plasticizers such as dibutyl sebacate; maleates such as dibutyl maleate; benzoates; sulfonamides such as N-ethyl toluene sulfonamide; organophosphates; polybutene; glycols/polyethers such as triethylene glycol dihexanoate; paraffinic process oils such as SUNPAR™ 2280 (Sunoco Corp.); specialty hydrocarbon fluids, and polymer modifiers; and those derived from renewable sources (i.e., biochemical plasticizers) such as epoxidized grain, e.g., soybean, corn, etc., oil. Mixtures of plasticizers are often used to obtain optimum properties.

If present, then the optional plasticizer typically comprises from greater than 0, e.g., 0.01 to 30 wt % of the composition. Preferably, the optional plasticizer is used in an amount ranging from 1 to 20, more preferably from 5 to 15, wt % based on the weight of the composition.

Optional Curing Agent

In one embodiment the semiconductive shield compositions of this invention are crosslinked, either fully or partially. In those embodiments in which the composition is to be crosslinked, e.g., in which one or both of the OBC and optional elastomer contain silane functionality, the composition typically contains at least one crosslinking agent and/or promoter and/or scorch retardant to facilitate the crosslinking of the composition. These optional components include, but are not limited to, (1) a free radical initiator, e.g., an organic peroxide or an azo compound, (2) silane functionality, e.g., vinyl alkoxy silane or silane functional polyolefin with vinyl alkoxy silane typically activated with moisture, (3) a sulfur-containing curative to facilitate vulcanization, and (4) a radiation-curing agent to promote crosslinking of the composition with electromagnetic radiation, e.g., infrared (IR), ultraviolet (UV), visible, gamma ray, etc. Representative scorch inhibitors include but are not limited to 2,2,6,6-tetramethylpiperidinoxyl (TEMPO) and 4-hydroxy-2,2,6,6-tetramethylpiperidinoxyl (4-hydroxy TEMPO). Representative promoters include but are not limited to triallyl isocyanurate; ethoxylated bisphenol A dimethacrylate; α-methyl styrene dimer; and other co-agents such as those described in U.S. Pat. Nos. 5,346,961 and 4,018,852. These optional crosslinking agents, promoters and scorch inhibitors are used in known ways and in known amounts.

Free Radical Initiator

Suitable free radical initiators used as crosslinking agents are the dialkyl peroxides and diperoxyketal initiators. These compounds are described in the *Encyclopedia of Chemical Technology*, 3$^{rd}$ edition, Vol. 17, pp 27-90 (1982). Mixtures of two or more free radical initiators may also be used together as the free radical initiator. In addition, free radicals can form from shear energy, heat or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy) butanol and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of free radical initiator present in the composition can vary with the minimum amount being sufficient to afford the desired range of crosslinking. The minimum amount of free radical initiator is at least about 0.02 wt %, or at least about 0.05 wt %, or at least about 0.1, wt % based upon the weight of the crosslinkable polymer(s). The maximum amount of free radical initiator in the composition can vary, and it is typically determined by such factors as cost, efficiency and degree of desired crosslinking. The maximum amount may be less than about 20 wt %, or less than about 10 wt %, or less than about 5, wt % based upon the weight of the crosslinkable polymer(s).

Additives

The compositions of this invention may also contain additives. Representative additives include but are not limited to antioxidants, cross linking co-agents, cure boosters and scorch retardants, processing aids, coupling agents, ultraviolet stabilizers (including UV absorbers), antistatic agents, nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 wt % or less to 20 wt % or more based on the weight of the composition.

Suitable UV light stabilizers include hindered amine light stabilizers (HALS) and UV light absorber (UVA) additives. Representative UV absorber (UVA) additives include benzotriazole types such as Tinuvin 326 and Tinuvin 328 commercially available from Ciba, Inc. Blends of HAL's and UVA additives are also effective. Examples of antioxidants include hindered phenols such as tetrakis[methylene (3,5-di-tert-butyl-4-hydroxyhydro-cinnamate)]methane; bis [(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one embodiment the components of the compositions used in the practice of this invention are added to a batch or continuous mixer for melt blending. The components can be added in any order or first preparing one or more masterbatches for blending with the other components. In one embodiment a masterbatch of conductive filler in one or a blend of resins is prepared and then added to the other resin or resins. Additives are usually blended with one or more other components before being added to the bulk resins and/or filler. In one embodiment the additives are added directly to the compounding line without the use of previously prepared masterbatches. Typically the melt blending is conducted at a temperature above the highest melting polymer but lower than the activation temperature of peroxide (if one is present). In one embodiment the peroxide is added in a subsequent step if the temperature of the composition cannot be adequately controlled to remain below the activation temperature of the peroxide. The melt blended composition is then either delivered to an extruder or an injection molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Molded electrical articles containing a semiconductive or other layer comprising a composition of this invention can be made via an injection molding process in which the compounded material is fed to the injection molding machine to manufacture a molded part of a given design.

A cable containing a semiconductive or other layer comprising a composition of this invention can be prepared with various types of extruders, e.g., single or twin screw types. These compositions should have extrusion capability on any equipment suitable for thermoplastic polymer extrusion. The most common fabrication equipment for wire and cable products is a single screw plasticizing extruder. A description of a conventional single screw extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric compound feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate used to filter any large particulate contaminates from the polymer melt. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure. The compositions outlined in this disclosure can typically be processed on any fabrication equipment that is suitable for extruding wire and cable compositions.

The compositions of this invention are useful in applications in which electrically conductive, highly flexible materials are needed, such as in wire and cable, electro-static films, belts and rollers, etc.

The following examples illustrate various embodiments of this invention. All parts and percentages are by weight unless otherwise indicated.

Specific Embodiments

All samples are prepared using a laboratory scale 250 cc BRABENDER batch mixer. The mixer is initially set at 120° C. and a rotor speed of 45 revolutions per minute (rpm). In each experiment first the polymer resin is loaded into the mixer, and then the carbon black is added slowly and mixed for 15 minutes at 45 rpm. Depending on the level of carbon black and the resin, melt temperatures ranges from 130 to over 150° C. at the end of the mixing cycle. After the carbon black has been mixed, the mixer speed is reduced to about 5 rpm and the material is allowed to cool down while the mixer is operated at low speed. Once the material is cooled, the peroxide is added and the mixture is compounded for additional 5 minutes at about 8-12 rpm to incorporate the peroxide while ensuring the compound temperature remains below 125° C. to prevent premature crosslinking. The compound thus prepared is compression molded into 75 mil plaques which are cured in a Wabash Model #30-1212-451-4ST MBX press for 10 min at 175° C. Specimens are cut from the cured plaque for mechanical properties measurements. Mechanical properties measurements are conducted per ASTM D638.

Volume resistivity test specimens are 8×2×0.75 inch plaques prepared by compression molding the compound under thermoplastic conditions. The specimens are cooled to room temperature and removed from the mold. Flattened copper conductors (16 AWG) are wrapped around each plaque at each end of the plaque so that the conductors are 2 inches apart, and each is about 1 inch from a plaque end. The wrapped plaques are placed back into the 8×2 inch mold, and the plaque is cured with mounted conductors in the press for 10 min at 175° C. The plaques are then cooled, released from the mold and ready for volume resistivity testing.

The materials used are:

ENGAGE™ 7447 ethylene-butene copolymer (0.865 g/cc, 5 MI), and containing 50-100 ppm IRGANOX® 1076;

ENGAGE™ 8200 ethylene-octene copolymer (0.870 g/cc, 5 MI), containing 50-100 ppm IRGANOX® 1076; and INFUSE™ 9507 ethylene-octene olefin multiblock copolymer (0.865 g/cc, 5 MI, 11% hard segment) containing 200 ppm IRGANOX® 1010, 350 ppm IRGANOX® 1076 and 1000 ppm of IRGAFOS 168.

Comparative Example 1 show a composition containing ENGAGE 7447 ethylene-butene copolymer with 35% carbon black. Initially the compound had a volume resistivity of 233 ohm-cm at 90° C., but when aged for 7 days the volume resistivity kept increasing and reached the value of 2330 ohm-cm. By contrast, as shown in Inventive Example 1, at the same conductive filler concentration the olefin multiblock copolymer resin initially exhibited equivalent volume resistivity but as the sample was aged, the volume resistivity remained stable during the 7 days aging period at about 100 ohm-cm. These results are plotted in the FIGURE.

On the mechanical properties, the slight loss in mechanical properties noticed is not significant compared to the significant gain in conductivity performance. Also since the ENGAGE 7447 POE compound did not meet the required conductivity, the comparison is not relevant as this compound would require higher levels of conductive filler to stabilize the conductivity, while key properties such as M100, Shore A and Elongation will undesirably suffer as shown in Comparative Example 3.

Comparative Example 2 shows the data for a compound using Engage 7447 POE with 30% conductive filler in which the samples are aged for a longer period of 21 days in an oven set at 90° C. Similar to Comparative Example 1, the volume resistivity is not stable and increases from about 80 ohm-cm on day 2 to close to 100,000 ohm-cm on day 21. By contrast, Inventive Example 2 shows a system with an OBC resin containing the same filler level, having an initial volume resistivity at 90° C. of about 118 ohm-cm, increasing relatively moderately to about 800 ohm-cam for the same aging period, which is about two orders of magnitude more stable.

Comparative Example 3 shows how much filler is required to stabilize the conductivity for ENGAGE 7447 POE. The data show that at 40% conductive filler, the volume resistivity is more stable, yet not as good as Inventive Example 1 which used less conductive filler (35% versus 40%). For illustration, comparing the volume resistivity data at 7 days aging time, the compound of Inventive Example 1 with 35% carbon black has a volume resistivity about 100 ohm-cm while Comparative Example 3 at 40% carbon black has a volume resistivity of 163 ohm-cm. However, the compound is highly stiff as shown by a Shore A of 90, M100 of 1610 psi, and a loss in elongation compared to Inventive Example 1. In addition such a highly filled compound is highly viscous and would be more difficult to process.

Comparative Example 4 shows data for ENGAGE 8200, an ethylene-butene copolymer, with 30% of the conductive filler, and similar to ENGAGE 7447, the compound exhibits unstable conductivity. By contrast Inventive Example 3 shows the counterpart system using OBC producing a much more stable conductive compound. Inventive Example 3 is a repeat experiment of Inventive Example 2. Although at the same composition, Inventive Example 2 and Inventive Example 3 show some variability in the volume resistivity which is a reflection to process control during sample preparation, this variability is still much smaller than a key aspect which is the subject of this invention. For example, at Day 19 of the aging period, the compounds of Inventive Example 1 and Inventive Example 3 show volume resistivity values of 674 and 200 ohm-cm respectively and in contrast, Comparative Example 2 and Comparative Example 4 show volume resistivity values of 95,300 and 100,000 ohm-cm respectively.

These results are not only about electrical conductivity which is driven by the level of conductive filler present in the polymer, but also about the ability of the conductive filler to form a stable conductive path at a given concentration for the electrical current to pass. As demonstrated by the examples, at similar filler concentrations, non-OBC olefin elastomers of similar density and melt index produced compounds exhibiting unstable conductivities after aging. By contrast, the volume resistivity of the OBC compounds remains low and highly stable when the material is aged at 90° C. for up to 25 days. This unexpected finding suggests that the substantially linear ethylene-butene or ethylene-octene copolymers will require a higher loading of carbon black to produce the desired stability in electrical conductivity, which will increase it stiffness as shown by the recorded data. On the other hand, the OBC resin may accept a lower loading of carbon black to produce an even more flexible compound. This enhanced performance may be driven by improved dispersion of the carbon black in the OBC resin due to its higher melting point, but more importantly also, the carbon black may reside preferentially in the amorphous phase of OBC, thus in fact enabling a higher concentration, thus a conductive path which is more stable.

The details and results of these examples are reported in the following tables and the FIGURE.

TABLE 1

Compositions and Mechanical Properties - Example 1

| | Comparative Example 1 | Inventive Example 1 |
|---|---|---|
| ENGAGE 7447 | 65 | — |
| INFUSE 9507 | — | 65.0 |
| Carbon Black XC 500 | 35.0 | 35.0 |
| Total | 100.0 | 100.0 |
| DCP Peroxide added in a second step (%) | 2.5 | 2.5 |
| Shore A | 84.6 | 89.4 |
| Tensile @ break (psi) | 2860 | 2448 |
| Elongation @ Break (%) | 291 | 269 |
| M100 (psi) | 1306 | 1304 |
| Energy to break (in*lb) | 96.8 | 89.6 |
| Trouser Tear Strength (lbf/in) | 26.5 | 23.2 |

TABLE 2

Volume Resistivity (ohm-cm) - Example 1

| Day | Temperature (° C.) | Comparative Example 1 | Inventive Example 1 |
|---|---|---|---|
| 0 | 26.2 | 1.02E+03 | 1.95E+02 |
| 1 | 90.2 | 2.33E+02 | 1.85E+02 |
| 2 | 90.2 | 2.46E+02 | 1.66E+02 |
| 3 | 90.2 | 2.57E+02 | 1.47E+02 |
| 4 | 90.2 | 4.00E+02 | 1.23E+02 |
| 5 | 90.3 | 8.93E+02 | 1.07E+02 |
| 6 | 90.3 | 1.57E+03 | 1.01E+02 |
| 7 | 90.4 | 2.33E+03 | 1.01E+02 |

TABLE 3

Comparative Examples 2 and 4 and Inventive Example 2

| | Comparative Example 2 | Inventive Example 2 | Comparative Example 3 |
|---|---|---|---|
| ENGAGE 7447 (0.865 g/cc, 5 MI, Shore A | 70.0 | — | 60.0 |
| INFUSE 9507 (0.866 g/cc, 5 MI, Shore A = 63) | — | 70.0 | — |
| Carbon Black (XC 500) | 30.0 | 30.0 | 40.0 |
| Total | 100.0 | 100.0 | 100.0 |
| DCP Peroxide (wt %) | 2.5 | 2.5 | 2.5 |
| ShoreA | 81 | 84 | 90 |
| Tensile@Peak (psi) | 2649 | 2226 | 2566 |
| Elong. @ break (%) | 333 | 257 | 178 |
| M100 (psi) | 822 | 998 | 1610 |
| Trouser Tear (lbf/in) | 32.2 | 25.6 | 26.7 |

| Aging Time (Days) | Volume Resistivity | | | Temperature, C. |
|---|---|---|---|---|
| 1 | 1.17E+02 | 1.43E+02 | 1.54E+01 | 27.1 |
| 2 | 8.00E+01 | 1.18E+02 | 1.24E+01 | 89.9 |
| 3 | 7.89E+01 | 1.13E+02 | 1.23E+01 | 89.8 |
| 4 | 8.45E+01 | 1.12E+02 | 1.24E+01 | 89.8 |
| 5 | 1.08E+02 | 1.15E+02 | 1.26E+01 | 89.8 |
| 6 | 1.88E+02 | 1.34E+02 | 1.34E+01 | 89.8 |
| 7 | 3.72E+02 | 1.57E+02 | 1.63E+01 | 89.9 |
| 8 | 6.65E+02 | 1.81E+02 | 2.05E+01 | 89.7 |
| 9 | 1.07E+03 | 2.07E+02 | 2.65E+01 | 89.7 |
| 10 | 1.78E+03 | 2.40E+02 | 3.21E+01 | 89.8 |
| 11 | 2.93E+03 | 2.82E+02 | 3.89E+01 | 89.9 |
| 12 | 5.03E+03 | 3.24E+02 | 4.77E+01 | 89.8 |
| 13 | 9.72E+03 | 3.60E+02 | 5.85E+01 | 89.8 |
| 14 | 4.10E+04 | 4.01E+02 | 7.18E+01 | 89.8 |
| 15 | 9.56E+04 | 4.41E+02 | 8.79E+01 | 89.8 |
| 16 | 9.97E+04 | 4.82E+02 | 1.09E+02 | 89.8 |
| 17 | 9.87E+04 | 5.31E+02 | 1.37E+02 | 89.8 |
| 18 | 9.64E+04 | 5.83E+02 | 1.74E+02 | 89.9 |
| 19 | 9.53E+04 | 6.47E+02 | 2.10E+02 | 89.8 |
| 20 | 9.52E+04 | 7.24E+02 | 2.37E+02 | 89.7 |
| 21 | 9.69E+04 | 8.16E+02 | 2.56E+02 | 89.7 |

Comparative Examples 4 and Inventive Example 3

| | Comparative Example 4 | Inventive Example 3 |
|---|---|---|
| ENGAGE 8200 (0.870 g/cc, 5 MI) | 70.0 | — |
| INFUSE 9507 (0.866 g/cc, 5 MI) | — | 70.0 |
| Carbon Black (XC 500) | 30.0 | 30.0 |
| Total | 100.0 | 100.0 |
| DCP Peroxide (wt %) | 2.5 | 2.5 |
| Shore A | 86 | 83.4 |
| Tensile @ break (psi) | 3072 | 1981 |
| Elong. @ break (%) | 334 | 251 |
| M100 (psi) | 1126 | 967 |
| Tear Die B Strength (lbf/in) | 397 | 294 |

| Aging Time (Days) | Volume Resistivity | | Temperature, C. |
|---|---|---|---|
| 0 | 1.52E+02 | 1.68E+02 | 25.0 |
| 1 | 2.38E+02 | 2.63E+02 | 84.7 |
| 2 | 1.23E+02 | 1.11E+02 | 87.1 |
| 3 | 1.19E+02 | 1.07E+02 | 88.4 |
| 4 | 1.22E+02 | 1.07E+02 | 88.0 |
| 5 | 1.33E+02 | 1.05E+02 | 86.2 |
| 6 | 1.83E+02 | 1.04E+02 | 85.7 |
| 7 | 2.68E+02 | 1.04E+02 | 84.8 |
| 8 | 4.07E+02 | 1.05E+02 | 84.8 |
| 9 | 6.44E+02 | 1.08E+02 | 86.4 |
| 10 | 9.42E+02 | 1.11E+02 | 84.8 |
| 11 | 1.47E+03 | 1.17E+02 | 85.9 |
| 12 | 2.10E+03 | 1.24E+02 | 86.1 |
| 13 | 2.86E+03 | 1.31E+02 | 89.9 |
| 14 | 4.83E+03 | 1.42E+02 | 86.8 |
| 15 | 2.29E+04 | 1.51E+02 | 86.5 |
| 16 | 9.87E+04 | 1.64E+02 | 87.1 |
| 17 | 1.03E+05 | 1.75E+02 | 85.7 |
| 18 | 1.06E+05 | 1.94E+02 | 87.3 |
| 19 | 1.05E+05 | 2.00E+02 | 85.8 |
| 25 | 1.71E+05 | 2.89E+02 | 86.0 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A composition comprising-on weight percent based on the weight of the composition:
   (A). 60 to 99% an ethylene-alpha-olefin multiblock interpolymer (OBC) (1) having a weight average molecular weight (Mw) of greater than (>) 40,000 grams per mole (g/mol), (2) having a molecular weight distribution (Mw/Mn) of 1.7 to 3.5, and (3) comprising one or more hard segments and one or more soft segments, the hard and soft segments having a difference of alpha-olefin content of less than 18.5 mole percent (mol %), and
   (B). 40 to 1% conductive filler.

2. The composition of claim 1 further comprising at least one of:
   (C). An elastomer other than an OBC,
   (D). A plasticizer,
   (E). A cure agent, and
   (F). One or more additives.

3. The composition of claim 2 in which the conductive filler is at least one of carbon black, conductive carbon and metal particles.

4. The composition of claim 2 in which the conductive filler is at least one of graphene and carbon nanotubes.

5. The composition of claim 3 further comprising at least one of aluminum, zinc, iron, nickel, tin, lead, and silver.

6. The composition of claim 3 in which the elastomer other than an OBC is present in an amount of 1 to 35 wt % based on the weight of the composition, and is at least one of a polyolefin homopolymer and interpolymer.

7. The composition of claim 3 in which the elastomer other than an OBC is present in an amount of 1 to 35 wt % based on the weight of the composition, and is a non-olefin elastomer comprising at least one of silicone elastomer, urethane elastomer, styrene-butadiene rubber (SBR), nitrile rubber, chloroprene, fluoroelastomer, perfluoroelastomer, polyether block amide and chlorosulfonated polyethylene.

8. The composition of claim 3 in which the plasticizer is present in an amount of 1 to 20 wt % based on the weight of the composition.

9. The composition of claim 6 in which at least one of the OBC and elastomer comprises silane functionality.

10. The composition of claim 3 in which the cure agent is present and is at least one of an organic base, carboxylic acid, sulfonic acid, and an organometallic compound.

11. The composition of claim 1 free of halogen.

12. A wire or cable article comprising the composition of claim 1.

* * * * *